(12) United States Patent
Uchida

(10) Patent No.: US 7,386,200 B2
(45) Date of Patent: Jun. 10, 2008

(54) PHOTONIC CIRCUIT BOARD

(75) Inventor: Mamoru Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/532,720

(22) PCT Filed: Dec. 5, 2003

(86) PCT No.: PCT/JP03/15590

§ 371 (c)(1),
(2), (4) Date: Apr. 27, 2005

(87) PCT Pub. No.: WO2004/053544

PCT Pub. Date: Jun. 24, 2004

(65) Prior Publication Data

US 2006/0056756 A1    Mar. 16, 2006

(30) Foreign Application Priority Data

Dec. 11, 2002    (JP)    ............... 2002-359199

(51) Int. Cl.
G02B 6/42 (2006.01)
G02B 6/13 (2006.01)
H04B 10/12 (2006.01)

(52) U.S. Cl. ............... 385/17; 385/14; 385/89; 398/141; 398/164

(58) Field of Classification Search ............ 385/14, 385/17, 89; 398/141, 164
See application file for complete search history.

(56) References Cited

U.S. PATENT DOCUMENTS

| 5,191,219 | A | 3/1993 | Linke | 250/551 |
|---|---|---|---|---|
| 5,218,654 | A | 6/1993 | Sauter | 385/24 |
| 5,416,861 | A | 5/1995 | Koh et al. | 385/14 |
| 5,699,373 | A | 12/1997 | Uchida et al. | 372/27 |
| 6,343,171 | B1 | 1/2002 | Yoshimura et al. | 385/50 |
| 6,453,083 | B1 * | 9/2002 | Husain et al. | 385/17 |
| 6,571,030 | B1 | 5/2003 | Ramaswami et al. | 385/17 |
| 6,597,826 | B1 | 7/2003 | Ramaswami et al. | 385/17 |
| 6,611,635 | B1 | 8/2003 | Yoshimura et al. | 385/14 |
| 6,625,345 | B2 * | 9/2003 | Reznichenko | 385/18 |
| 6,650,803 | B1 | 11/2003 | Ramaswami et al. | 385/17 |
| 6,690,845 | B1 | 2/2004 | Yoshimura et al. | 385/14 |
| 6,768,572 | B2 * | 7/2004 | Romanovsky | 359/245 |
| 6,897,430 | B2 | 5/2005 | Uchida | 250/214.1 |
| 6,977,820 | B2 | 12/2005 | Uchida | 361/761 |
| 2001/0032984 | A1 * | 10/2001 | Uchida | 257/84 |

(Continued)

FOREIGN PATENT DOCUMENTS

EP    1 219 994 A2    3/2002

(Continued)

Primary Examiner—M. R. Connelly-Cushwa
Assistant Examiner—Jerry T Rahll
(74) Attorney, Agent, or Firm—Fitzpatrick, Cella, Harper & Scinto

(57) ABSTRACT

A photonic circuit board comprises a connection setting circuit, a group of electric wires for connecting the connection setting circuit and a plurality of devices, an optical I/O (input/output) device connected to the connection setting circuit and a two dimensional optical transmission medium connected to the optical I/O device and adapted to transmit optical signals. The connection setting circuit includes a circuit capable of changing the mode of connection of the group of electric wires and the optical I/O device.

4 Claims, 12 Drawing Sheets

U.S. PATENT DOCUMENTS

| | | | |
|---|---|---|---|
| 2002/0028045 A1 | 3/2002 | Yoshimura et al. | 385/50 |
| 2002/0039464 A1 | 4/2002 | Yoshimura et al. | 385/14 |
| 2002/0097962 A1 | 7/2002 | Yoshimura et al. | 385/50 |
| 2002/0109074 A1 | 8/2002 | Uchida | 250/214.1 |
| 2002/0167013 A1* | 11/2002 | Iwasaki et al. | 257/79 |
| 2004/0037553 A1 | 2/2004 | Ramaswami et al. | 398/5 |
| 2004/0076365 A1 | 4/2004 | Ramaswami et al. | 385/16 |
| 2006/0216200 A1 | 9/2006 | Nagatomo | 422/68.1 |

FOREIGN PATENT DOCUMENTS

| | | |
|---|---|---|
| EP | 1 219 994 A2 | 7/2002 |
| JP | 6-69490 | 3/1994 |
| JP | 6 69490 | 11/1994 |
| JP | 7-183629 | 7/1995 |
| JP | 7 183629 | 7/1995 |
| JP | 9 214073 | 8/1997 |
| JP | 9-214073 | 8/1997 |
| JP | 10 341063 | 12/1998 |
| JP | 10/341063 | 12/1998 |
| JP | 2002-277694 | 9/2002 |
| JP | 2002-286959 | 10/2002 |
| WO | 01/33895 A2 | 5/2001 |
| WO | WO 01/33895 A2 | 5/2001 |
| WO | 2004/038702 | 5/2004 |

* cited by examiner

PHOTONIC CIRCUIT BOARD

TECHNICAL FIELD

The present invention relates to a photonic circuit board adapted to utilize light in order to transmit signals and also to a semiconductor device using such a circuit board.

BACKGROUND ART

When data signals are transmitted by way of a metal wire at high speed (e.g., at a rate of 1 Gbps), electronic devices and wires disposed in the vicinity thereof are affected by so-called electromagnetic interference (EMI).

The intensity of EMI is expressed by the strength of the source (frequency, waveform, drive current)×transfer coefficient (resonance with the power supply line, coupling with nearby lines)×antenna factors (connectors, electrodes). In other words, it is known that the intensity of EMI depends on the length of the wire, the electric current value, the signal transferring velocity, the signal pulse waveform and so on.

Attempts have been made to utilize optical wires (waveguides that can propagate optical signals) in order to avoid the influence of EMI in view of the fact that the transfer coefficient is reduced to nil in a circuit where only optical wires are used because no electro-magnetic induction takes place there.

For instance, U.S. Pat. No. 5,191,219 discloses an information processing apparatus as defined below.

It defines an information processing apparatus comprising means forming a planar optical waveguide which extends in two dimensions and serves as a shared medium, a plurality of light-emitting means and a plurality of light-detecting means extending in a two dimensional arrangement over said planar optical waveguide for broadcasting light signals and abstracting light signals, respectively, into and from said planar optical waveguide, and a plurality of subsystems including input and output ports for processing the light signals in the shared medium, the light-detecting means being coupled to input ports and the light-emitting means being coupled to output ports of the subsystems.

Apart from the above defined information processing apparatus, signal transmission utilizing optical wires will be described by referring to FIG. 16 of the accompanying drawings.

Referring to FIG. 16, when devices A, B and C (2010, 2020 and 2030) transmit signals to device D (2040), the devices A, B and C normally transmit signals to respective O/E devices (2041, 2042 and 2043) by way of E/O devices (2011, 2021 and 2031) that are respectively connected to them. In FIG. 16, reference symbol 2060 denotes optical wires, which are schematically drawn and in fact correspond to line-shaped waveguides. However, an optical I/O (input/output) device (more specifically an E/O device or an O/E device) is generally expensive and hence it is desirable to reduce the number of optical I/O devices that are involved in the circuit.

DISCLOSURE OF THE INVENTION

Therefore, it is the object of the present invention to provide a photonic circuit board that can reduce the number of optical I/O devices and also a semiconductor apparatus comprising such a circuit board.

According to the invention, the above object is achieved by providing a photonic circuit board comprising a connection setting circuit, a group of electric wires for connecting the connection setting circuit and a plurality of devices, an optical I/O (input/output) device connected to the connection setting circuit and a two dimensional optical transmission medium connected to the optical I/O device and adapted to transmit optical signals, the connection setting circuit including a circuit capable of changing the mode of connection of the group of electric wires and the optical I/O device.

Thus, according to the invention, there is provided a photonic circuit board that can reduce the number of optical I/O devices.

In an embodiment of the invention, the connection setting circuit is so arranged that a number of electric wires of the group of electric wires are connected to a single optical I/O device. In another embodiment of the invention, the connection setting circuit is so arranged that the number of optical I/O devices is smaller than the number of electric wires of the group of electric wires.

According to the invention, a group of electric wires connected to device are not fixedly connected to respective optical I/O devices but they are connected to an optical I/O device by way of a connection setting circuit. In this way, it is no longer necessary to provide each device with an optical I/O device.

The mode of connection can be changed by utilizing a reconfigurable integrated circuit such as FPGA (field programmable gate array) for the connection setting circuit.

More specifically, a photonic circuit board according to the invention is a multilayer circuit board realized by laying electric wiring layers and optical wiring layers and including a plurality of electronic devices. It may be a multilayer circuit board comprising devices having a gate array adapted to selectively establish wiring for electronic devices, using wires selected out of a plurality of wires including electric wires for electric connection of the entire route that include those of an electric wiring layer and optical wires with EO devices having a function of converting an electric signal of an electronic device into an optical signal and transmitting it into an optical wiring layer and OE devices having a function of receiving an optical signal and converting it into an electric signal.

With such an arrangement, when electric wires and optical wires coexist, an operation of switching wires is specifically realized by reconfiguring the circuits of the gate array devices according to a predetermined program in response to a request for changing the wiring that is issued from an electronic device to a mediating device.

BEST MODES FOR CARRYING OUT THE INVENTION

Now, the present invention will be described in greater detail by referring to the accompanying drawings that illustrate preferred embodiments of the invention.

First Embodiment

Figure 15:
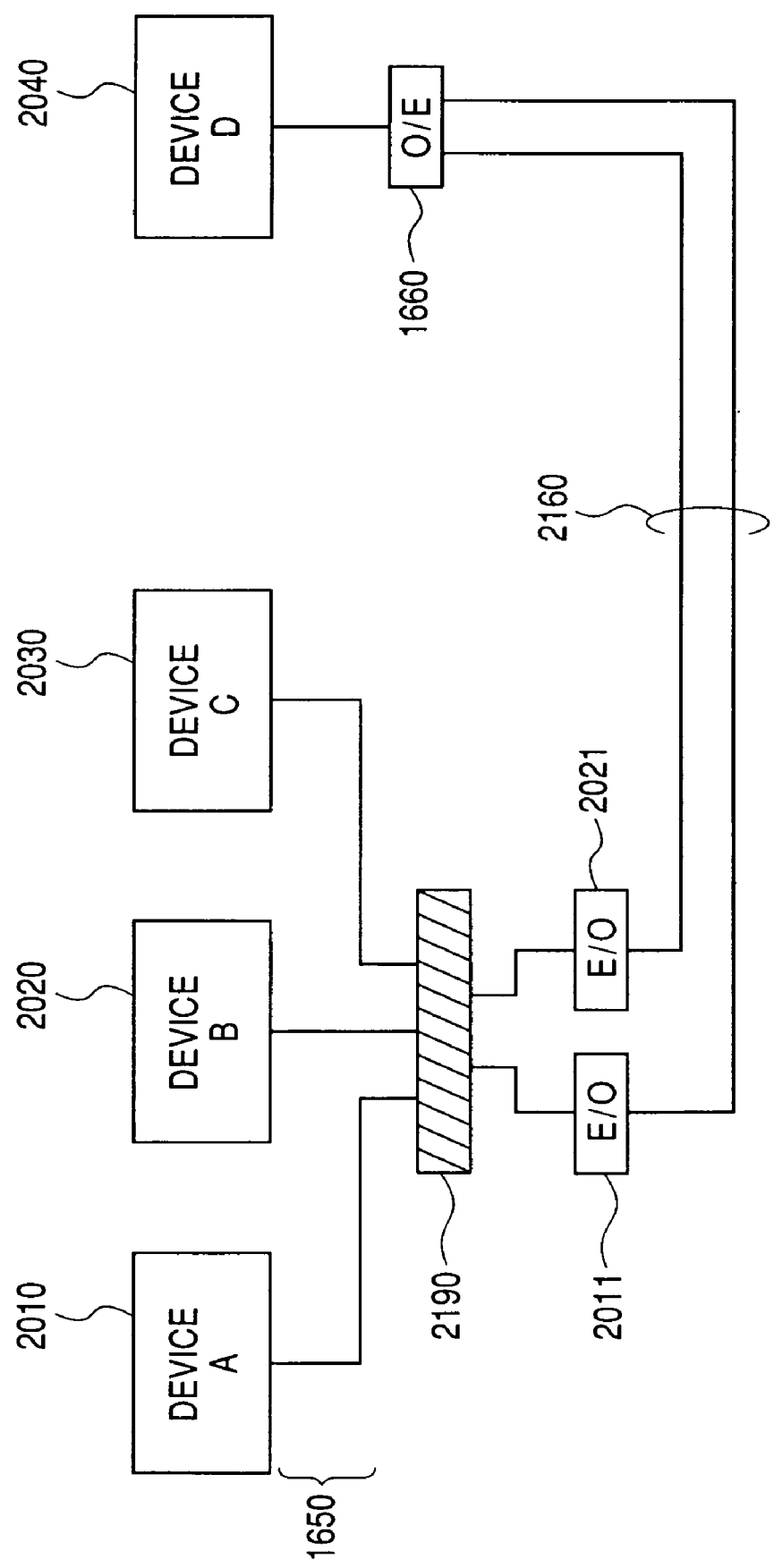
FIG. 15 is a schematic illustration of the configuration of the first embodiment of the invention.
Figure 16:
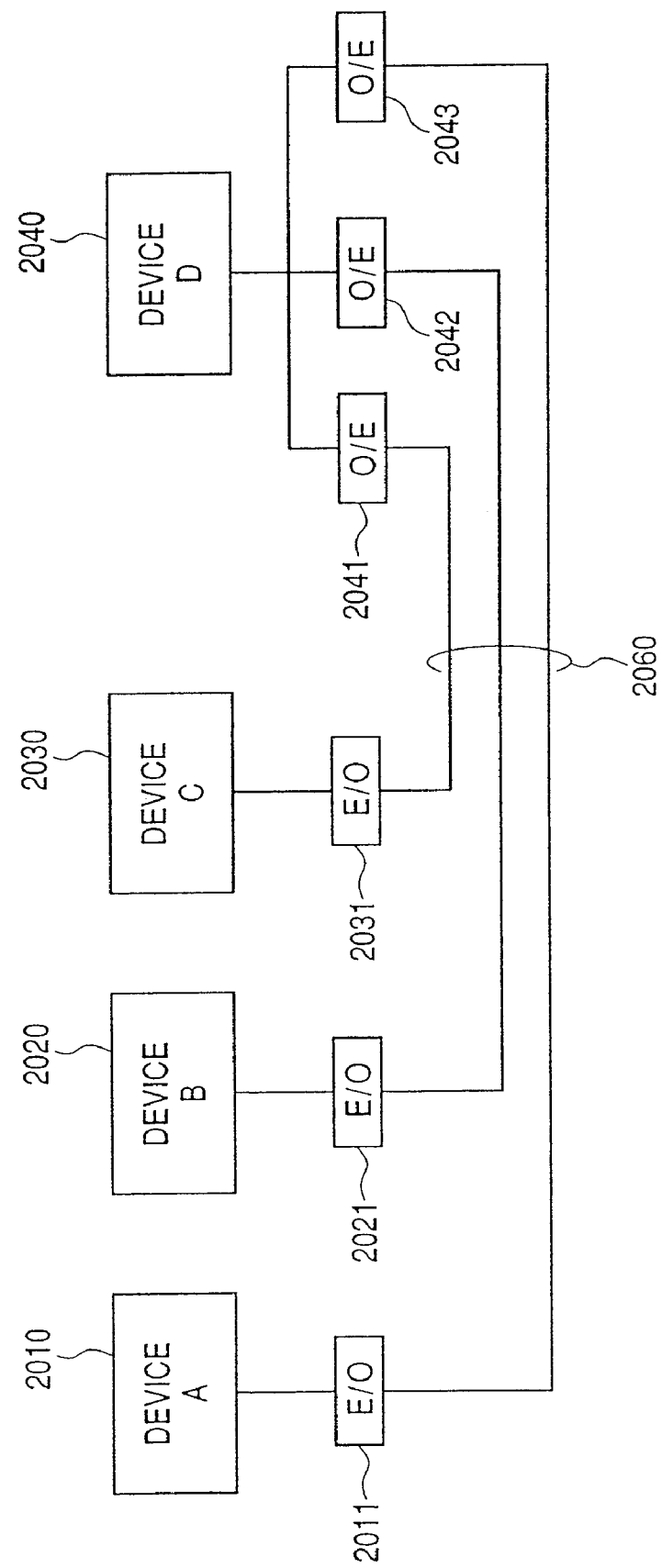
FIG. 16 is a schematic illustration of the prior art.

Now, the first embodiment of the present invention will be described by referring to FIG. 15. FIG. 15 schematically illustrates the configuration of the first embodiment of photonic circuit board according to the invention. While the first embodiment is described below in terms of E/O devices that are used as optical I/O devices, the following description also applies to O/E devices. In other words, the following description applies to both E/O devices and O/E devices. For the purpose of the present invention, an optical I/O device refers to a device that can input or output an optical signal and an E/O device refers to a device that can convert an electric signal into an optical signal, whereas an O/E device refers to an device that can convert an optical signal into an electric signal.

In FIG. 15, there are shown a connection setting circuit 2190, a group of electric wires 1650 for electrically connecting the connection setting circuit 2190 and a plurality of devices (devices A, B and C which are denoted respectively by 2010, 2020 and 2030) and E/O devices 2011 and 2021 connected to the connection setting circuit 2190. While two E/O devices are shown in FIG. 15, the number of E/O devices is not subjected to any particular limitation on the condition unless each of the devices 2010, 2020 and 2030 is provided with an E/O device, although it is preferable that the number of E/O devices is smaller than the number of devices that are connected to the connection setting circuit 2190 by way of the group of electric wires. In FIG. 15, reference symbol 2160 denotes an optical transmission medium for optically connecting the E/O devices to an O/E device 1660. It is preferable that the optical transmission medium is a two dimensional type optical transmission medium. Furthermore, if a plurality of E/O devices need to be connected with the optical transmission medium as shown in FIG. 15, a two dimensional type optical transmission medium that is commonly applicable to the E/O devices is preferably used. For the purpose of the present invention, a two dimensional optical transmission medium may be a sheet-shaped or planar (or curved) optical waveguide. Then, an optical signal is transmitted through the sheet-shaped or planar waveguide by intra-planar propagation.

The connection setting circuit 2190 takes the role of defining the connections of the devices (A, B and C) and the E/O devices. While the connection setting circuit is only required to have a switching function, a reconfigurable integrated circuit such as FPGA may preferably be used for it. Since a reconfigurable integrated circuit such as FPGA (field programmable gate array) comprises a combination circuit formed by using AND circuits and OR circuits, or logic blocks adapted to operate as flip-flops or the like, and wiring blocks adapted to maintain the connections among the logic blocks by means of memory devices such as SRAMs, which are arranged on a single chip carrying SRAMs (static random access memories) as memory devices, the connections among the logic blocks can be defined by externally supplying circuit configuring data to the memory devices of the wiring blocks and therefore, it is possible to repeatedly and dynamically rewrite the internal circuit configuration. In other words, with such an arrangement, it is possible to change the mode of connection between the devices (2010, . . . ) and the E/O devices by means of the connection setting circuit.

Now, an operation of signal transmission between the device A (2010) and the device D (2040) that is conducted on the basis of the present invention will be discussed below. A signal may be transmitted between the device A and the device D by means of electric wiring (not shown) as long as no problem arises to obstruct the transmission using the electric wiring. However, assume here that the signal transmission using the electric wiring needs to be switched to optical transmission for some reason or another (probably the electric wiring has fallen in trouble). Then, the connection setting circuit 2190 selects the device A and at least one of the E/O device to define the connection between the device A and the device D that enables the signal transmission. If, for example, the E/O device 2021 is selected, a corresponding optical signal is input to the O/E device 1660 by way of the two dimensional type optical transmission medium 2160 and then transmitted to the device D. If the connection setting circuit is a reconfigurable integrated circuit, the connection that has been set can be changed freely so that, for example, the device B (2020) and the device D may be connected to each other. It may be needless to say that changing the mode of connection may refer to switching from optical transmission to electric transmission. A detection device (to be also referred to as mediating device hereinafter) may preferably be arranged between the device A and the device D in order to detect any problem that may arise between them.

It is preferable that the above described connection setting circuit is adapted to connect a single optical I/O device and a plurality of wires out of the group of wires. It is also preferable that the number of optical I/O devices is smaller than the number of wires of the group of wires.

A semiconductor apparatus is realized by connecting the group of wires of a photonic circuit board according to the invention and various devices (which may include IC chips and/or integrated circuits).

Second Embodiment

Figure 1A:
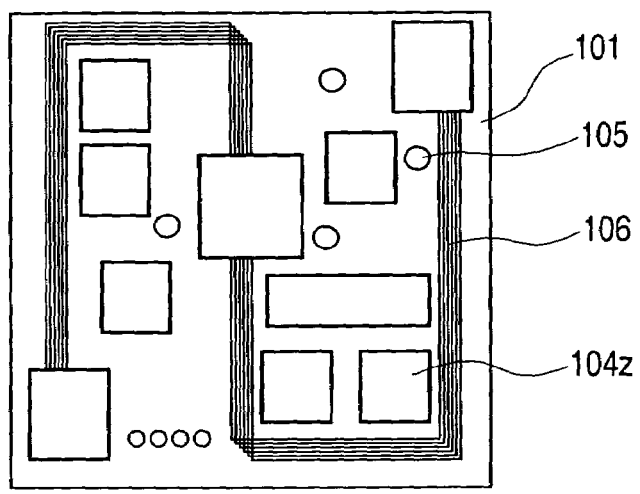
FIG. 1A is a schematic plan view of the electric wiring layer, illustrating the second embodiment of the invention.
Figure 1B:
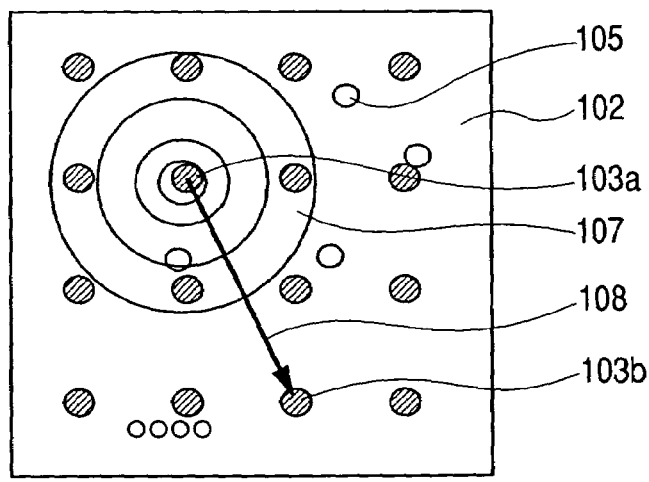
FIG. 1B is a schematic plan view of the optical wiring layer, also illustrating the second embodiment of the invention.
Figure 1C:
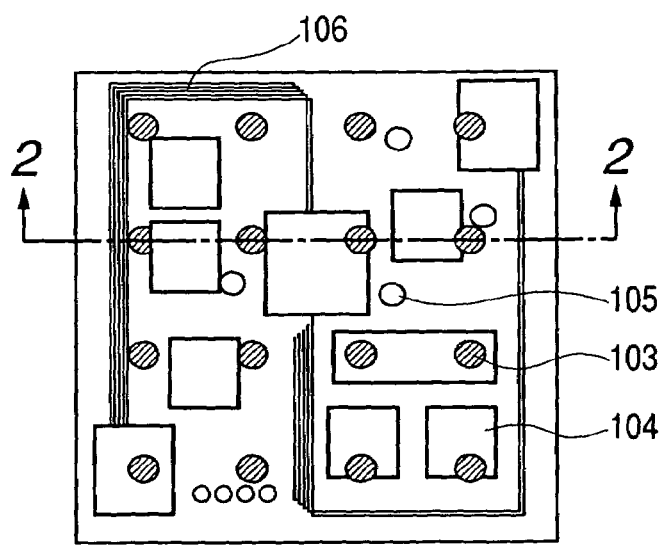
FIG. 1C is a schematic plan view of the second embodiment of the invention, illustrating the electric wiring layer and the optical wiring layer that are put together.

FIGS. 1A through 1C schematically illustrate the second embodiment of photonic circuit board according to the invention. FIG. 1A is a schematic plan view, in which reference symbol 101 denotes the uppermost electric wiring layer and reference symbol 104 collectively denotes electronic devices such as LSIs, which are represented by blank squares, whereas reference symbol 104z denotes a mediating device that has a functional feature of defining a wire switching operation and reference symbol 106 denotes electric wires connecting the devices. In FIG. 1A, reference symbol 105 denotes via holes that run through the electric wiring layer 101. FIG. 1B schematically illustrates only the optical wiring layer 102 that is located under the electric wiring layer 101. Unlike the electric wiring layer 101, the optical wiring layer 102 is realized in the form of a sheet-shaped two-dimensional (2D) optical waveguide 102. In FIG. 1B, reference symbol 103 collectively denotes optical I/O devices such as light-emitting devices and light-detecting devices (which may include emitters for E/O conversion and detectors for O/E conversion as well as their drive circuits) and reference symbol 107 schematically indicates the diffusion/propagation of an optical signal, whereas reference symbol 108 schematically indicates the propagation of the beam of an optical signal. FIG. 1C shows an image of the electric wiring layer and the optical wiring layer as put together and projected from above. Thus, FIG. 1C illustrates the positional relationship of the electronic devices 104 and the optical I/O devices 103.

Figure 2:
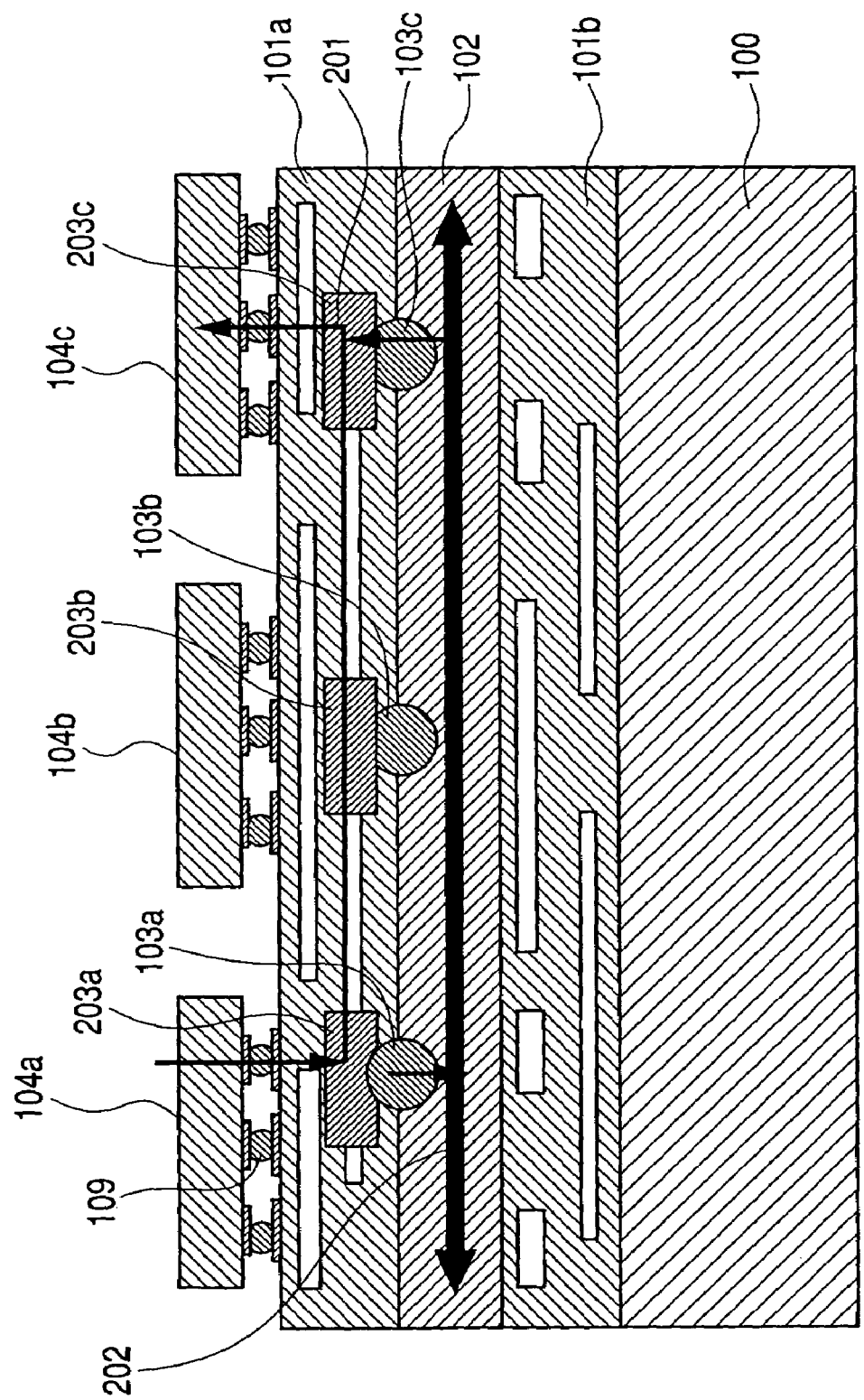
FIG. 2 is a schematic cross sectional view of the second embodiment of the invention taken along line 2-2 in FIG. 1C.

FIG. 2 is a schematic cross sectional view taken along line 2-2 in FIG. 1C. In the case of this embodiment, on a holding substrate 100, the optical wiring layer 102 is sandwiched between a pair of electric wiring layers 101a and 101b and optical I/O devices 103 are arranged near the interface of the electric wiring layer 101a and the optical wiring layer 102. Additionally, field programmable gate arrays (FPGAs) or programmable logic devices (PLDS) 203 are arranged near the respective optical I/O devices in the electric wiring layer 101a and electrically connected to the respective nearest optical I/O devices 103. As described earlier, a photonic circuit board can be realized by using a connection setting circuit and E/O devices whose number is smaller than the number of electronic devices 104. In other words, the number of E/O devices may be smaller than the number that is defined when they show 1 to 1 correspondence to electronic devices.

Holding substrate 100 is typically made of a ceramic material and the optical wiring layer 102 is film-shaped, whereas the electric wiring layers 101 may be built-up layers. Electronic devices 104 such as LSIs are mounted on the surface of the electric wiring layer 101a by way of bumps (e.g., solder balls) 109. The gate arrays (FPGAs or PLDs) 203 are characterized in that the internal wiring thereof can be reconfigured by a program that is supplied externally or internally relative to the devices. An FPGA or PLD is a logic device in which a large number of gate arrays are integrally formed and whose internal wiring pattern can be almost freely changed by selecting an external or internal program. Such devices have been and being popularly used in cellular phones and similar apparatus whose design can be frequently subjected to changes.

Figure 3:
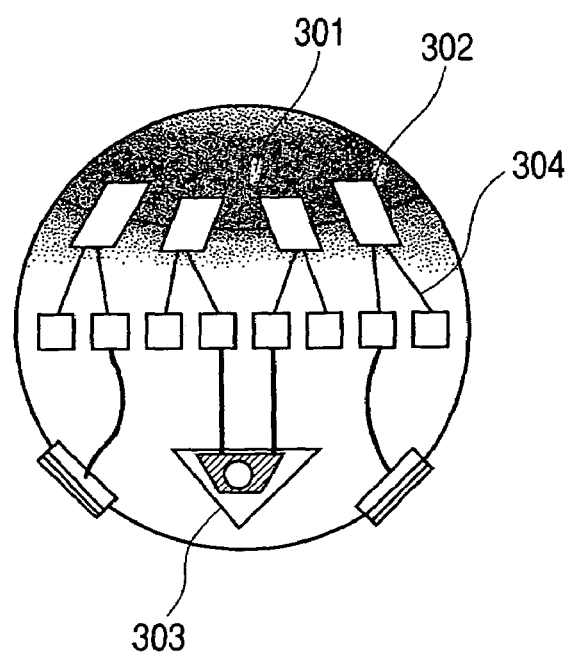
FIG. 3 is a schematic illustration of a photonic ball IC.

Now, a photonic ball IC will be described below as optical I/O device 103 that is used in relation with an FPGA or PLD. FIG. 3 is a schematic illustration of a photonic ball IC. Since light-emitting devices and/or light-detecting devices can be integrally formed along with CMOS circuits on the surface of a spherical semiconductor having a diameter of about 1 mm dia. and hence the photonic ball IC operates as optical IC and shows a spherical profile, it can be made to diffuse light in a desired direction in a 2D plane and emit a light beam in a desired or specific direction or detect a light beam coming in a desired or specific direction.

Referring to FIG. 3, reference symbol 301 denotes an undoped spherical Si substrate (typically having a thickness of 1 mm dia.) and reference symbol 302 collectively denotes ICs formed on the surface of one of the hemisphere (northern hemisphere in FIG. 3). Reference symbol 303 collectively denotes optical devices formed on the southern hemisphere, which may be light-emitting devices or light-detecting devices (including non-limitatively four GaInNAs/AlGaAs type surface light-emitting lasers or surface type photodiodes formed on (111)-equivalent planes in this embodiment) and reference symbol 304 collectively denotes electric wires. When the ICs 302 are integrally formed with light-emitting devices 303, they may be drive ICs or parallel/serial conversion circuits. When, on the other hand, the ICs 302 are integrally formed with light-detecting devices 303, they may be bias circuits, preamps, waveform regulating circuits or serial/parallel conversion circuits. When the devices 303 are adapted to operate both as light-emitting devices and light-detecting devices, corresponding electronic circuits need to be added thereto. Such circuits can normally be prepared through a CMOS process and the logic voltage thereof may be 3.3V or of some other voltage value.

Figure 4:
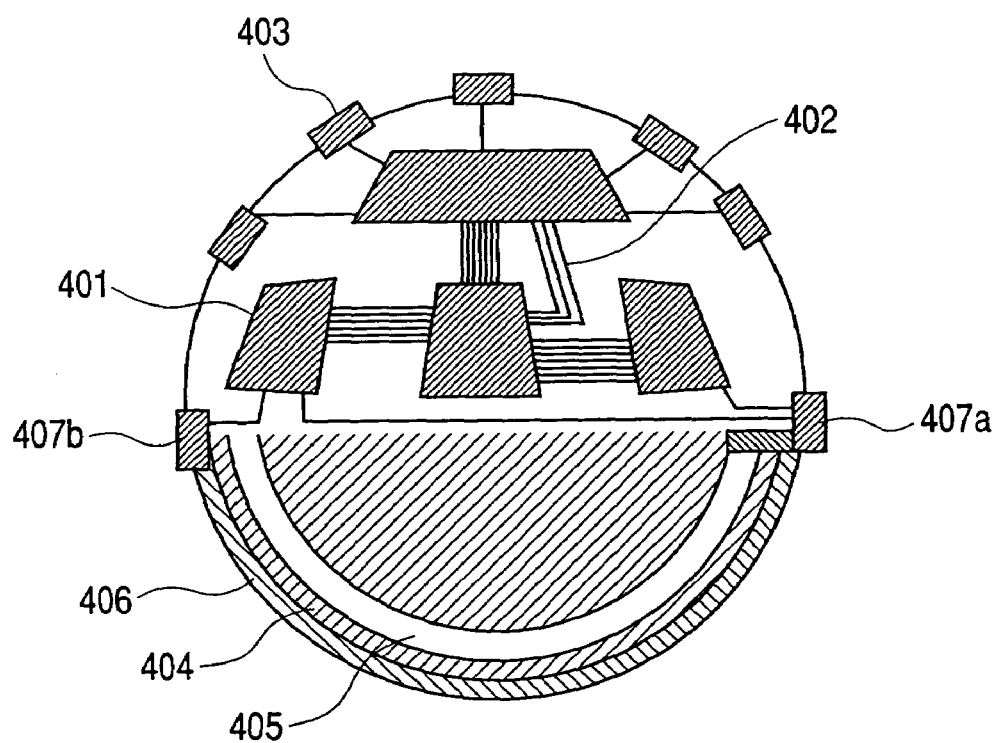
FIG. 4 is a schematic illustration of another photonic ball IC.

FIG. 4 is a schematic illustration of another photonic ball IC. In FIG. 4, the electronic circuit sections 401, the electric wires 402 and the electrode pad sections 403 for the electronic circuit sections are similar to their counterparts of FIG. 3 but the optical devices are remarkably different from those of FIG. 3. Additionally, reference symbol 407 collectively denotes electrode pads for optical devices formed on contact layer 406 and reference symbol 405 denotes an active layer showing a semispherical profile and sandwiched between clad layers 404. If the optical devices are light-emitting devices, carriers injected through the electrode pads 407 for the optical devices are recombined in the active layer to emit light. If, on the other hand, the optical devices are light-detecting devices, the active layer 405 is reverse-biased and detected light form electron-hole pairs there. In either case, it is not necessary to provide a separate optical system for emission or absorption of light and E/O or O/E conversion can carried out highly efficiently because the photonic ball IC is spherical.

A photonic ball IC as shown in FIG. 4 may be used when data are transmitted in a diffusion/propagation mode 107 by way of the optical wiring layer 102 of FIG. 1B, whereas a photonic ball IC as shown in FIG. 3 may be used when data are transmitted in a beam/propagation mode 108. A photonic device can highly suitably be used in a photonic circuit board according to the invention particularly in terms of structure and function.

While each of the optical I/O devices 103 is formed independently near an FPGA or PLD 203 in FIG. 2, the optical I/O devices 103 and the FPGAs or PLDs 203 may be integrally formed on a photonic ball IC to enhance their effects. Advantages of integrally forming the devices include a raised upper limit of transfer rate, a reduced power consumption rate, a reduced workload for assembling and a reduced cost due to the use of shortened wires.

Now, the principle of operation of this embodiment will be described below by referring to FIG. 2.

To begin with, an operation of switching from electric wiring to optical wiring will be discussed. Assume here that data are transmitted from LSI 104*a* to LSI 104*c* that are mounted in the electric wiring layer 101*a*, which LSIs 104*a* and 104*c* may be so two CPUs, a CPU and a RAM or the like. If they are subjected to little load and data are transferred at a rate of about 10 MHz, they are little influenced by EMI, wiring delay or the like so that the ordinary electric wiring (e.g., of the electrically wired route 201) operates on a stable basis. At this time, all the PLDs 203 on the electric wiring 201 are off and hence the optical I/O devices 103 are not connected.

Then, assume that the two LSIs are driven to operate with a high data transfer rate, e.g. at a rate of 800 MHz so that the electric wiring 201 can no longer accurately transfer data because of EMI, wiring delay or the like. Furthermore, if another LSIs 104*b* that is arranged between them is also driven to operate at a high data transfer rate (or with a large electric current), the influence of its EMI may probably not be negligible. If the LSI 104*a* is not driven to operate at such a high data transfer rate, it may give rise to an operation error due to the electromagnetic field induced in the inside by a change in the environment that contains external electric waves. Then, a mediating device (e.g., the mediating device 104*z* in FIG. 1A) detects the problem and specifies an optical I/O device 103 to be used by the LSI 104*a*. The specified optical I/O device may normally be the one located closest to the LSI 104*a* (the optical I/O device 103*a* in FIG. 2) but it is not limited to use the optical I/O device 103*a*. This provides a characteristic aspect of the present invention. The use of a specific optical I/O device for an electronic device is not defined in advance. In other words, an optical I/O device is selected each time there arises a request for optical wiring/connection. As a result, it is sufficient to provide a small number of optical I/O devices, which is by far smaller than the number of electronic devices. On the other hand, switching devices need to be arranged near the internal wiring layer in order to select one or more than one optical I/O devices and FPGAs or PLDs are used as switching devices for the purpose of the present invention.

An optical I/O device is specified in a manner as described below. Upon receiving a notification of the problem from the mediating device, the PLDs (e.g., PLDs 203*a* and 203*c*) receive a switching program or switching pattern data from the mediating device and reconfigure the circuit by selectively turning on/off the gate arrays according to the instructions contained therein. For example, they may switch from the electrically wired route 201 that has been used as bypass to the optically wired route 202 that includes the optical I/O devices 103*a* and 103*c* en route. If the program is so designed that all the other optical I/O devices 103 are turned off, the optical I/O devices 103*a* and 103*c* can exclusively use the optical wiring layer 102.

Thus, the data that could not be transferred successfully by way of the electrically wired route are now transferred through the 2D optical waveguide 102 by diffusion/propagation or beam/propagation as they take the form of an optical signal obtained as a result of E/O conversion by the optical I/O device 103*a*. As the optical signal gets to the optical I/O device 103*c* (a photo-detector+an amplifier in this instance), it is then subjected to O/E conversion to restore the original data, which are then transferred to the destination LSI 104*c* by way of the PLD 203*c* that is electrically connected to the LSI 104*c*. The optical I/O devices 103*a* and 103*c* may, if necessary, continue to occupy the optical wiring layer or they may release the optical wiring layer and return to the electric wiring. The data may be transferred by way of the optical I/O devices by diffusing a light beam through the entire light wiring layer and/or by selectively irradiating a region of a part of the optical wiring layer with a light beam.

On the other hand, the above described procedure is reversed to switch from the optical wiring to the electric wiring. When the operation of transferring data by way of the optical wiring is over, the electric wiring will be automatically reselected if the program is so designed.

It is also possible to switch from the current electrically wired route to another. When data are not transferred accurately by the ordinary wired route, it may be possible to transfer data accurately simply by switching the wired route. Furthermore, when the optically wired route is already occupied and the data transfer is too urgent to wait until it becomes free, some other electrically wired route may possibly need to be used. For such a case, it may be so arranged for reconfiguring the circuit that the mediating device provides the gate array device with a program that opens the gate for another electrically wired route.

While the optical I/O device 103*a* that is located closest to the LSI 104*a* is used in the above description, the I/O device may be already occupied. Then, it is possible to transfer optical data by way of another optical I/O device that is located close to the occupied I/O device, the optical device 103*b* for instance. In short, any optical I/O device 103 can be used by switching the program provided by the mediating device.

As for reconfiguring optical/electric wiring, the freedom of wiring can be dramatically improved by making both electric wiring and optical wiring applicable to inter-device connections. Now, an instance where a reconfigurable integrated circuit is applied to both E/O devices and O/E devices will be discussed below.

Figure 10:
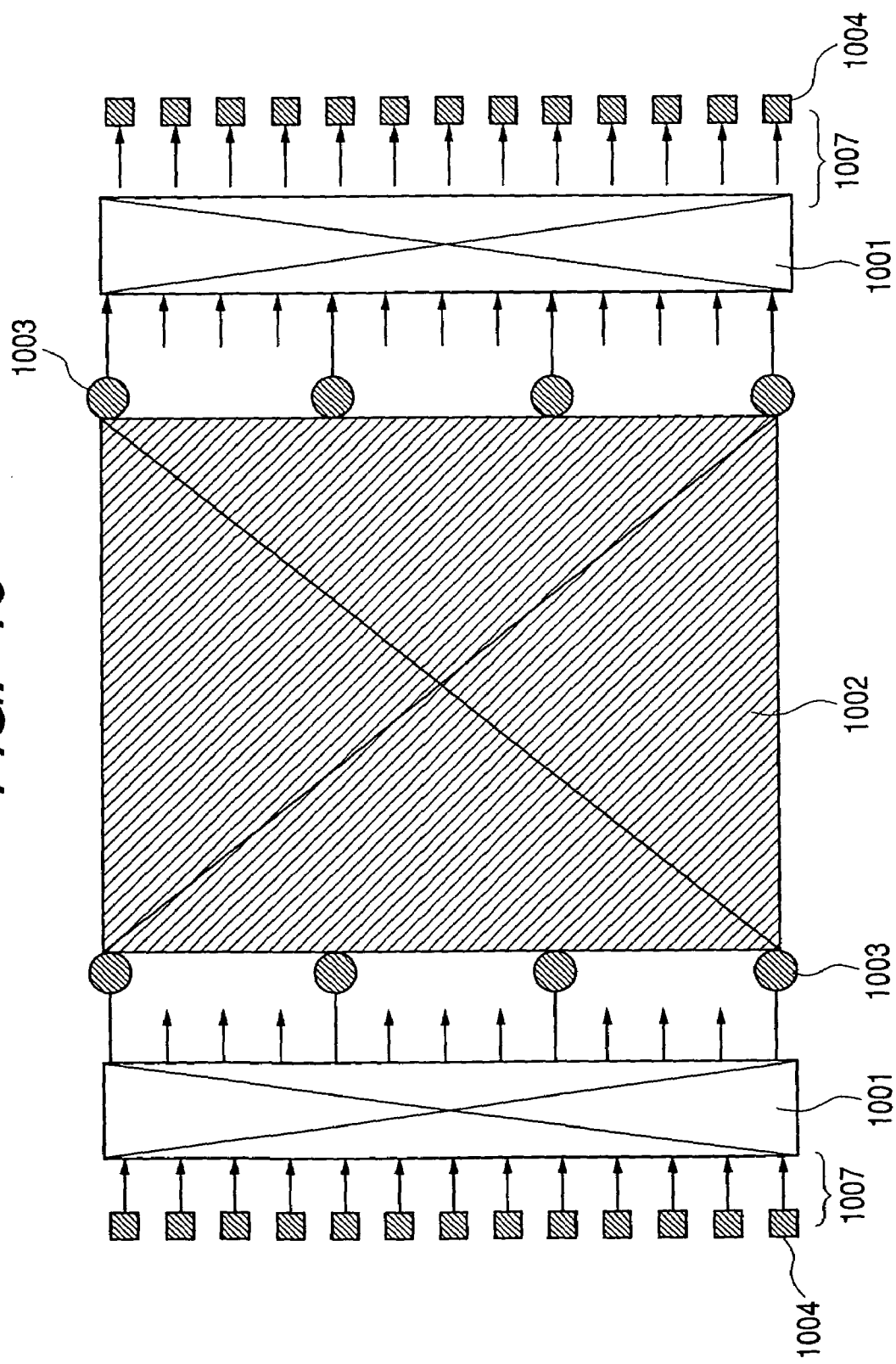
FIG. 10 is a schematic illustration of the concept of the present invention.

FIG. 10 is a schematic illustration of reconfiguring optical/electric wiring. In FIG. 10, reference symbol 1004 collectively denotes electric terminals of LSIs or the like and reference symbol 1001 collectively denotes electric networks comprising reconfigurable integrated circuits such as PLD, whereas reference symbol 1003 collectively denotes optical I/O devices (those arranged at the left side are E/O devices and those arranged at the right side are O/E devices in FIG. 10) and reference symbol 1002 denotes an optical network comprising optical I/O devices and an optical wiring layer. Each of the electric networks 1001 and the related terminals 1004 are connected by way of a group of electric wires 1007.

Any electric terminal can select a desired internal wire by way of the corresponding electric network 1001. For example, it can switch the internal wire and connect itself to the input side of a desired optical I/O device by way of a PLD so as to switch from an electric signal to an optical signal. Additionally, it can connect itself to a desired optical I/O device in the optical network (the simplest technique being entire diffusion/propagation). The optical signal is converted into an electric signal in the optical I/O device, which then connects itself to a desired terminal by way of the corresponding electric network 1001. The entire arrangement operates as ordinary electric wiring when the PLDs and the optical network are not used.

In this way, the freedom of wiring can be dramatically improved by combining one or more than one electric networks and one or more than one optical networks.

This will be described in greater detail below. Ideally, any LSI terminal in the arrangement can be connected to any existing terminal for the purpose of transmitting an electric signal. According to the present invention, such an ideal situation is realized by means of reconfiguration of electric wiring and that of optical wiring. It is possible to select a wire out of a plurality of wires by connecting a plurality of LSI terminals to a nearby PLD and switching wires in the PLD. More specifically, the wires are those connected to the input terminals of a plurality of optical I/O devices located in the vicinity. From the point of view of an optical I/O device, what is important here is that a number of wires are connected to it. In other words, an optical I/O device operates as interface for a plurality of terminals for the purpose of opto-electric conversion. To date, a single electric wire is coupled to an electric terminal for the purpose of converting an electric signal into an optical signal. With such an arrangement, as many optical I/O devices as the number of terminals are required but the use of such a large number of optical I/O devices is practically not feasible in view of the sizes of the devices and cost. To the contrary, according to the invention, it is possible to reconfigure the circuit wiring, using optical I/O devices whose number is by far smaller than the number of terminals.

As described above in detail, according to the invention, a photonic circuit board comprising optical I/O devices whose number is smaller than the number of devices that are connected to them by way of a group of electric wires is realized by arranging a wire connection setting circuit between the group of electric wires (which may be connected to a variety of devices) and the optical I/O devices.

Third Embodiment

Figure 5:
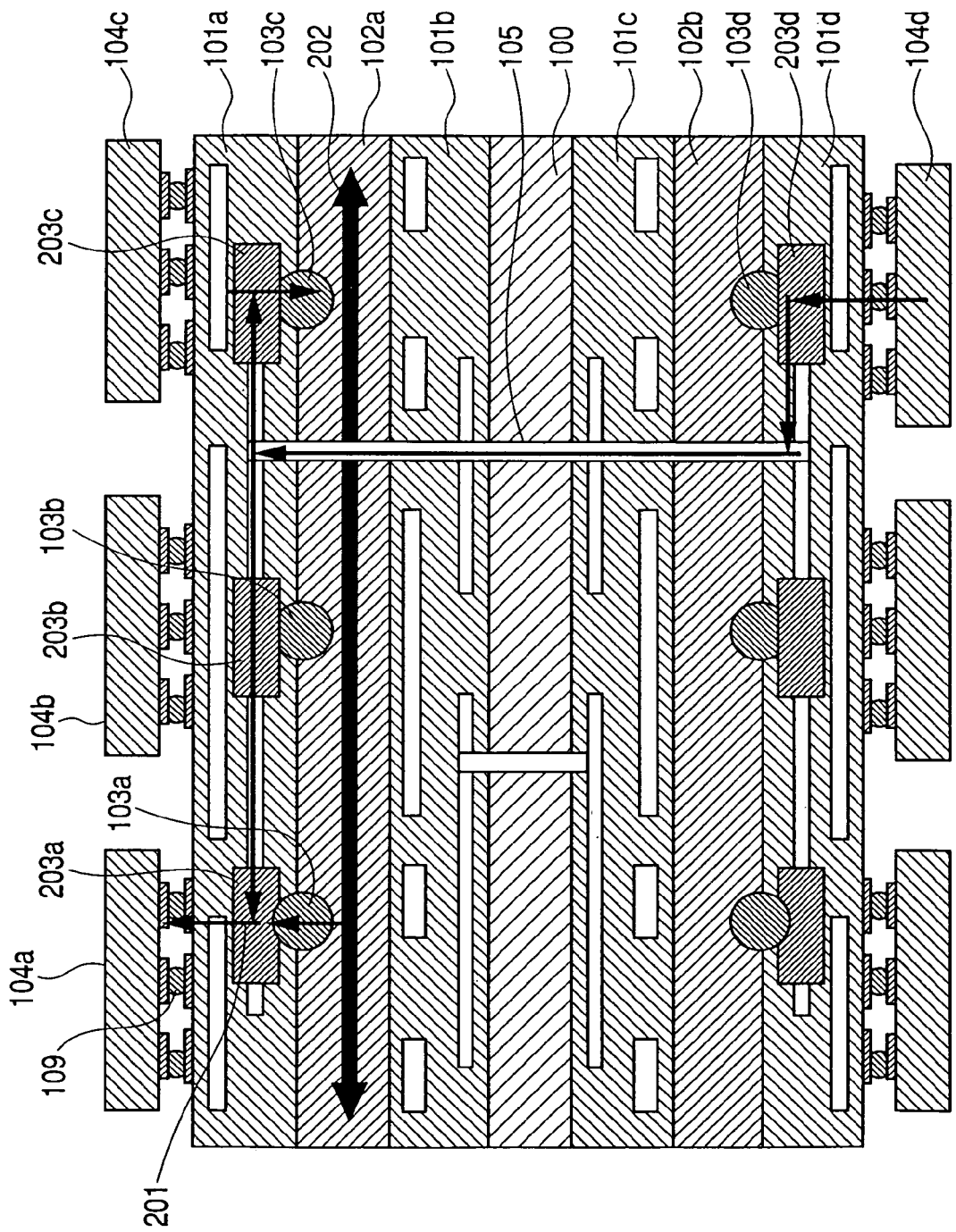
FIG. 5 is a schematic cross sectional view of the third embodiment of the invention.

FIG. 5 is a schematic cross sectional view of the third embodiment of the present invention, which is a multilayer type photonic circuit board. The third embodiment differs from the second embodiment in that a number of optical wiring layers 102 are provided at different levels, a via 105 runs through the optical wiring layers and electronic devices 104 are mounted on the top and the bottom of the circuit board. Each of the optical wiring layers 102 is adapted to transmit data by diffusing an optical signal on a planar basis as in the case of the second embodiment.

While the third embodiment operates basically same as the second embodiment, some characteristic aspects of the operation of this embodiment will be described below as supplement.

Assume an instance where data are transferred at a high transfer rate from LSI 104*d* to LSI 104*a* that are arranged at different levels. The ordinary wired route 201 covers the electric wiring layer 101*d* located immediately above the LSI 104*d*→via 105→electric wiring layer 101*a*→LSI 104*a*. Since all the gate arrays 203*d*, 203*b* and 203*a* on the route are off, they do not operate as gate.

While data are transferred without problem by way of the above route in an ordinary state, there can arise a situation where data can no longer be transferred normally. For example, if the electromagnetic field near a device located close to the electrically wired route 201 (e.g., LSI 104*b*) is intensified, the data transfer operation will be seriously affected in a region immediately below the electromagnetic field (due to EMI, wiring delay or the like). As the mediating device (not shown in FIG. 5) detects the situation, it decides to switch the electrically wired route 201 to an optically wired route to the largest possible extent. Electric wires are used for the span of the electric wiring layer 101*d* located immediately above the LSI 104*d*→via 105→electric wiring layer 101*a*. Then, the mediating device of this embodiment selects the optical I/O devices 103*c* and 103*a* and turns the gate arrays 203*c* and 203*a* on. Thereafter, it causes the optical I/O device 103*a* to perform E/O conversion on the data transferred from the LSI 104*d*, the optical data to be transmitted through the optical wiring layer 102*a* and the optical I/O device 103*a* to perform O/E conversion on the optical data to produce an electric signal, which is then taken in by the LSI 104*a* (by transferring a program to each of the related devices or notifying them of the program number of the program in the ROM). With this arrangement, the problem in the data transfer that is attributable to EMI can be avoided. If necessary, the mediating device notifies the optical I/O devices 103 or the gate array devices 203 of the program for restoring the original wired route. In this way, electric wires and optical wires can be selectively used by means of gate array devices.

Fourth Embodiment

Figure 6:
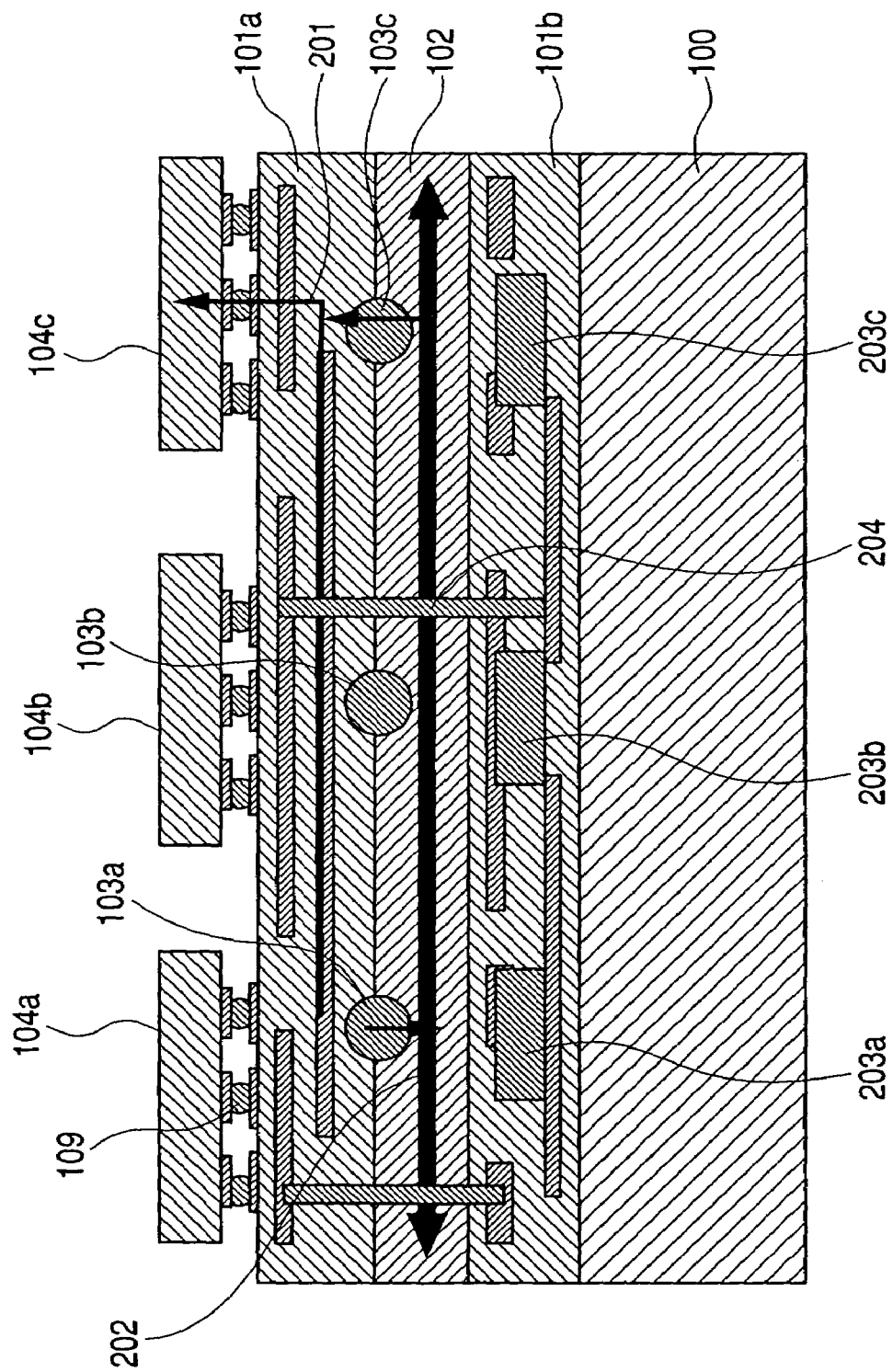
FIG. 6 is a schematic cross sectional view of the fourth embodiment of the invention.

FIG. 6 is a schematic cross sectional view of the fourth embodiment of the present invention. The parts and the devices of the embodiment that are same or similar to those of FIG. 2 are denoted respectively by the same reference symbols. In this embodiment, FPGAs or PLDs (gate array devices) 203 are concentrated (and integrally arranged) in a single electric wiring layer 101*b* located close to the optical I/O devices 103. This embodiment will provide additional advantages when the gate arrays 203 are integrated into a single chip. Such advantages include a raised upper limit of transfer rate, a reduced power consumption rate, a reduced workload for assembling and a reduced cost due to the use of shortened wires. Otherwise, this embodiment is identical with the first embodiment particularly in terms of operation and effects.

Fifth Embodiment

Figure 7:
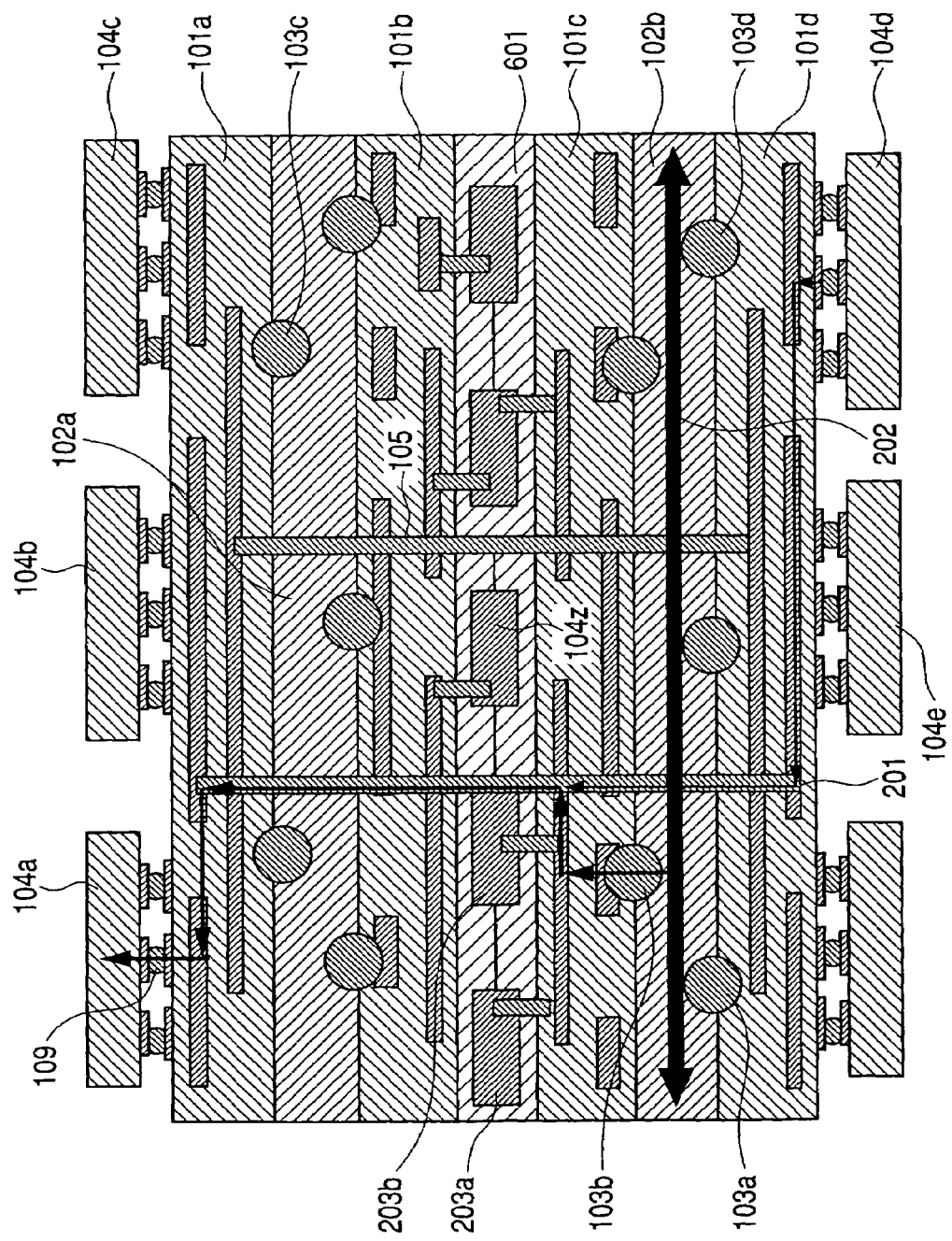
FIG. 7 is a schematic cross sectional view of the fifth embodiment of the invention.

FIG. 7 is a schematic cross sectional view of the fifth embodiment of the present invention, which is a multilayer type photonic circuit board. This embodiment differs from the fourth embodiment in that a number of optical wiring layers 102 are provided at different levels, that a via 105 runs through the optical wiring layers, that electronic devices 104 are mounted on the top and the bottom of the circuit board, that gate array devices 203 are arranged not in the vicinity of the optical I/O devices 103 but integrally in an exclusive gate array layer 601, that the mediating device 104*z* that specifies switching of wired route is also arranged in the layer 601 and that no support substrate 100 is provided. Each of the optical wiring layers 102 is adapted to transmit data by diffusing an optical signal on a planar basis as in the case of the preceding embodiments. While the gate array devices 203 are arranged in the electric wiring layer 101*b* that is located close to the optical I/O devices 103 in the fourth embodiment as pointed out above, they are concentrated in a single integral type gate array layer 601 that is located relatively remote from the optical I/O devices 103.

While FIG. 7 shows that a number of gate array devices 203 are incorporated into layer 601, all the devices may alternatively be integrated into a single chip. The latter arrangement is advantageous from the viewpoint of cost.

While the principle underlying the operation of this embodiment is same as that of the fourth embodiment, some characteristic aspects of the operation of this embodiment will be described below as supplement.

Assume here that data are transferred at a high transfer rate from LSI 104*d* to LSI 104*a* that are arranged at the different sides of the circuit board. The ordinary wired route 201 covers the electric wiring layer 101*d* located immediately above the LSI 104*d*→via hole 105→electric wiring layer 101a→LSI 104a. Data only pass through the gate array layer 601 by way of the via hole 105.

While data are transferred without problem by way of the above route in an ordinary state, there can arise a situation where data can no longer be transferred normally. For example, if the electronic device LSI 104e that is located close to the electrically wired route 201 generates EMI, the data transfer operation will be seriously affected in a region immediately above it. In such a case, it is advantageous to switch the electrically wired route to an optically wired route to the largest possible extent. In this embodiment, the mediating device 104z in the gate array layer 601 decides to select the optical I/O device 103d and the optical I/O device 103b respectively as E/O device and O/E device so as to reconfigure all the wiring in the gate array 203. In other words, the gate array layer 601 operates as a sort of switch board. Note that the above defined route is not unique and there may be a number of routes that can be taken. However, the mediating device 104z can each time select an optimal wiring pattern by referring to the wiring accomplishments in the past. In the instance of FIG. 7, the data from the LSI 104d are subjected to E/O conversion in the optical I/O device 103d and transmitted through the optical wiring layer 102b. Then, the optical data is subjected to O/E conversion in the optical I/O device 103b and the obtained electric signal is taken into the LSI 104a by way of the electric wiring layer 101c, the via 105 and the electric wiring layer 101a, following the optically wired route 202 shown in FIG. 7.

For this embodiment, (1) optical I/O devices and gate array devices can be designed, processed and mounted independently and (2) the process of preparing printed circuit boards can be simplified to realize low cost because the layers (the electrically wired layer, the optically wired layer and the gate array layer) take respective roles that are completely separated from each other.

Sixth Embodiment

Figure 8:
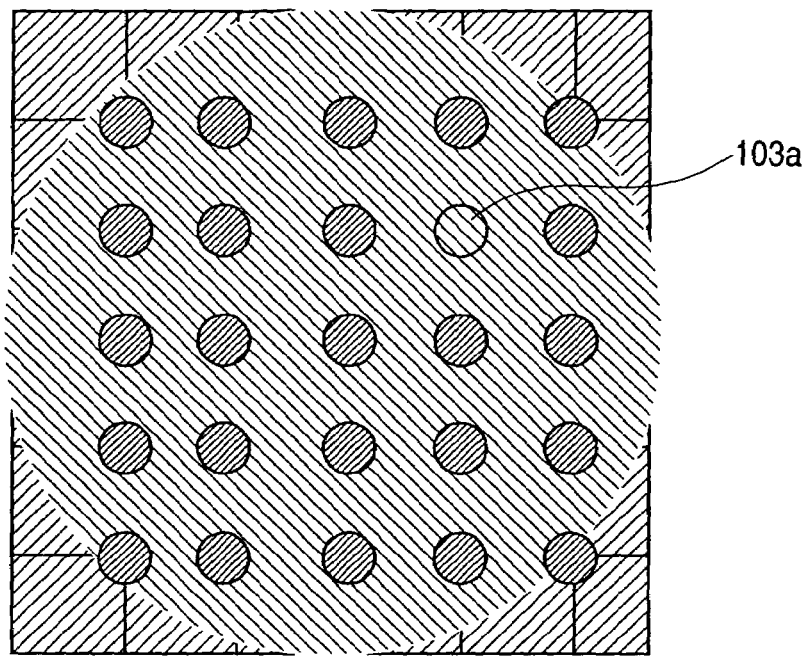
FIG. 8 is a schematic plan view of the sixth embodiment of the invention.

FIG. 8 schematically illustrates the sixth embodiment of the invention. In FIG. 8, reference symbol 103 collectively denotes optical I/O devices that are uniformly arranged on a photonic circuit board like a gridiron pattern. At the same time, gate arrays (not shown) are arranged near the respective optical I/O devices. Alternatively, 103 may collectively denotes devices each of which is formed by integrally combining an optical I/O device and a gate array device. Such a regular arrangement of devices simplifies not only the process of mounting gate arrays and optical I/O devices but also the structure of the gate arrays and the program to be used by the gate arrays for switching the wiring. The remaining components and the operation of the this embodiment are similar to those of the preceding embodiments.

Figure 11:
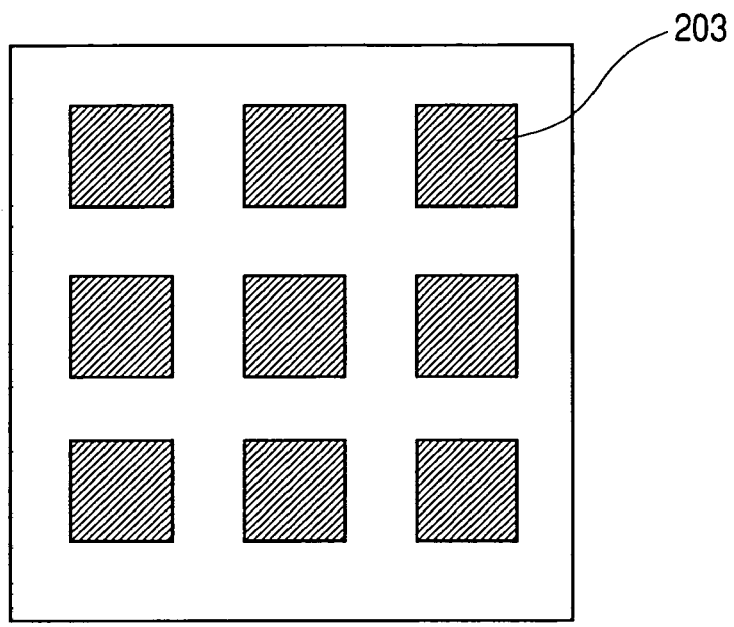
FIG. 11 is another schematic illustration of the concept of the present invention.

Now, a method of arranging the connection setting circuit (e.g., PLDS) for switching the electric wiring will be described below. A plurality of PLDs 203 may be arranged on a same plane in the form of a gridiron pattern as shown in FIG. 11 and connected with each other by way of an electric wiring layer. Such a regular arrangement provides an advantage of simplifying the operation of laying out the electric wiring layer. PLDs may be identical with each other or different from each other. A plurality of (e.g., 32) electric terminals may be connected to each PLD, which may by turn have output lines to be connected to four optical I/O devices. While an electrically wired route is normally used, the wiring arrangement is reconfigured by switching the internal wires of the PLDs according to the instruction from the mediating device (e.g., device 104Z in FIG. 1) when an optically wired route needs to be used or the electrically wired route needs to be switched to another. This function is carried out not only by a single PLD but also by a plurality of PLDs at the same instant. Photonic reconfiguration can be realized which allows flexible data transmission at high speed.

The above design concept may be developed in such a way that each PLD is arranged not only to simply switch wires but also to be reconfigured to operate as some other different device such as DSP. Then, it can be used as functionally completely different device although its positional arrangement is not changed at all.

Figure 12:
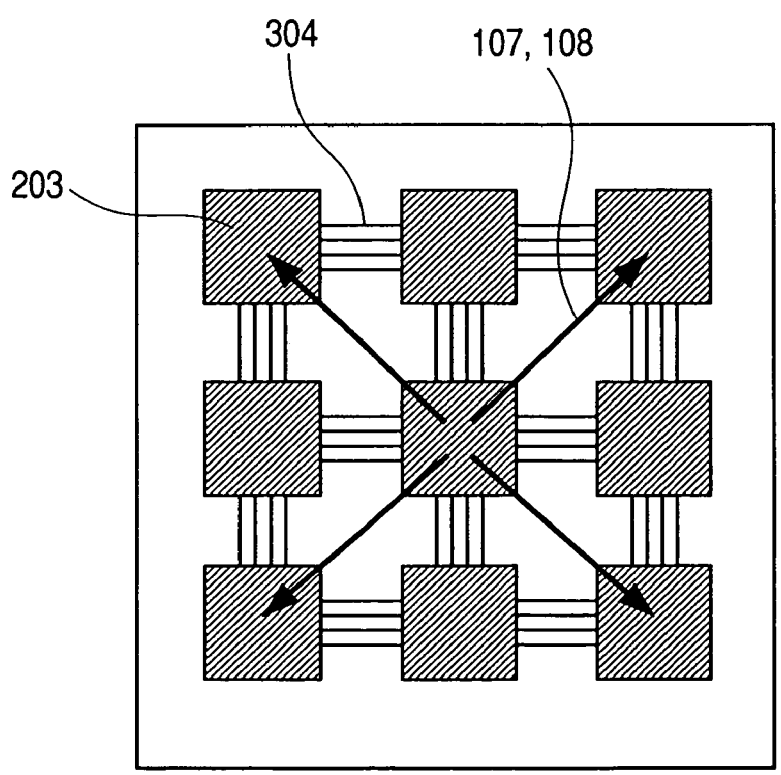
FIG. 12 is still another schematic illustration of the concept of the present invention.

In FIG. 12, PLDs 203, electric wires 304 and optical wires (including beams and diffusions) 107 and 108 are arranged on a same plane. In FIG. 12, the PLDs do not operate (for reconfiguration) independently but are electrically connected to each other so as to operate in a highly concerted manner and make the entire circuit to function as a reconfiguring medium. In other words, each PLD is adapted to reconfigure the circuit only in a region "surrounding" the PLD when it operates to simply switch wires, whereas it participate in reconfiguring the entire circuit when it can reconfigure itself. For example, terminal 1 connected to PLD 1 may be connected to any PLD because the PLDs are connected flexibly to each other (and can be connected to any place on the 2D plane).

An example of photonic reconfiguration will be described below by referring to FIG. 13.

Figure 13:
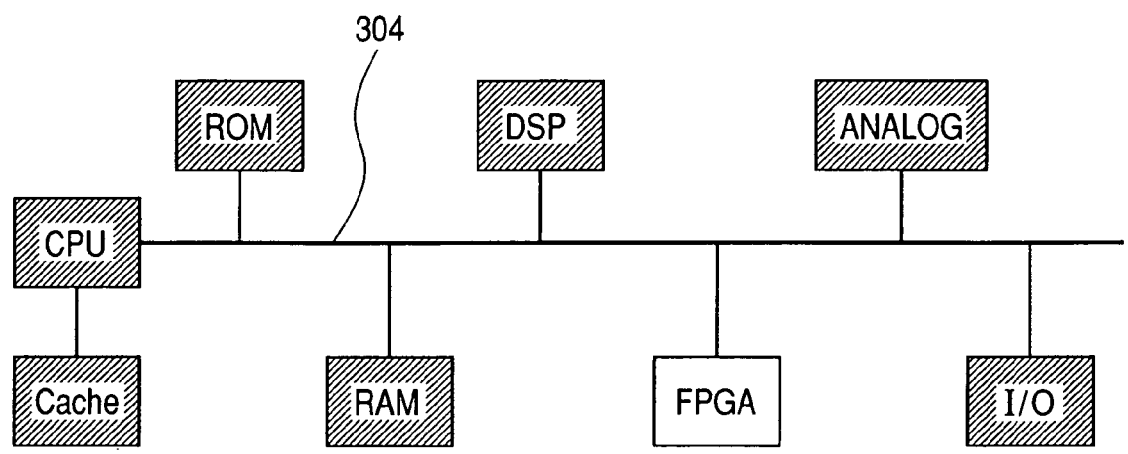
FIG. 13 is still another schematic illustration of the concept of the present invention.
Figure 14:
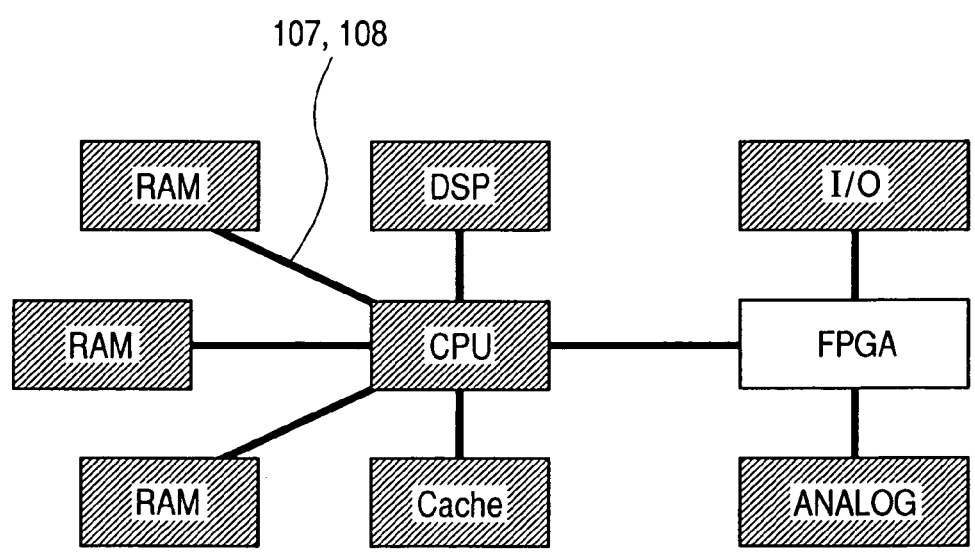
FIG. 14 is still another schematic illustration of the concept of the present invention.

Assume that FIG. 13 shows an ordinary wiring arrangement (Config. 1), in which a CPU, a RAM and a DSP are connected to each other by way of an ordinary bus 304. If this arrangement is realized in a single package or on a single substrate, it can be reconfigured so as to operate as a system device having a completely different wiring layout as shown in FIG. 14. If this reconfiguration is made by using only electric wires, the wire density becomes extremely high and consequently it is not possible to transfer data at a desired rate because of EMI, wiring delay or the like. In short, such reconfiguration is only possible according to the present invention.

Note that, in the above description, electric wiring refers to fixed wiring so that it may be fixed optical wiring realized by using 1D optical waveguide and optical fibers.

Seventh Embodiment

Figure 9:
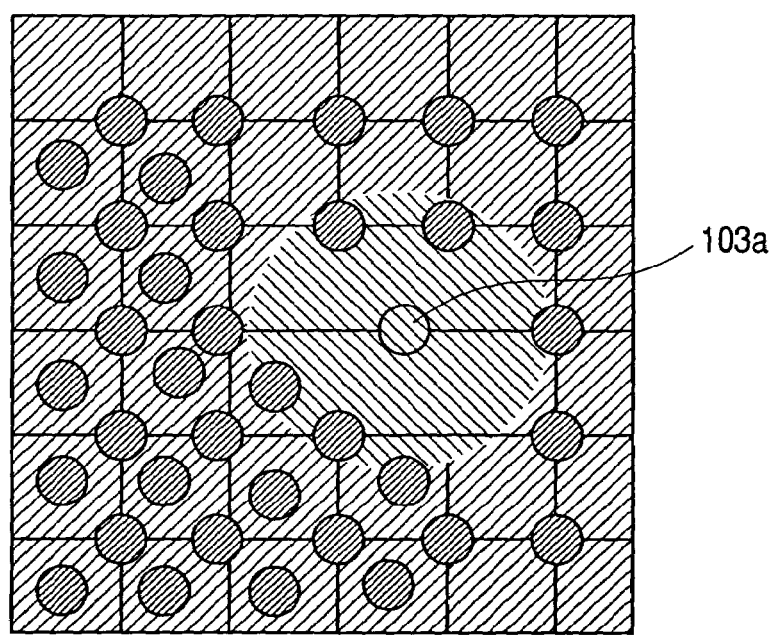
FIG. 9 is a schematic plan view of the seventh embodiment of the invention.

FIG. 9 is a schematic illustration of the seventh embodiment of the present invention. In FIG. 9, reference symbol 103 collectively denotes optical I/O devices arranged in the form of a desired pattern on a photonic substrate. At the same time, gate arrays are arranged near the respective optical I/O devices. In this embodiment again, alternatively, 103 may collectively denotes devices each of which is formed by integrally combining an optical I/O device and a gate array device. While such a free arrangement of optical I/O devices may complicate the operation of mounting gate arrays and optical I/O devices, it provides advantages including that it can restrict the applicable scope of optical wiring and allows to freely select a diffusion/propagation mode or a beam/propagation mode as illustrated in FIG. 1A. Otherwise, this embodiment is identical with the sixth embodiment. Note that a diffusion/propagation mode refers to a mode in which light is propagated from a signal source with a predetermined radiation angle, whereas a beam/propagation mode refers to a mode in which light is propagated as a beam in a direction leading to a particular device.

The sixth embodiment and the seventh embodiment or a combination thereof may be modified appropriately according to the required specification of the circuit board.

The invention claimed is:

1. A circuit board comprising:
   a sheet-shaped optical transmission medium for transmitting optical signals;
   a plurality of optical I/O devices connected to the sheet-shaped optical transmission medium;
   a reconfigurable integrated circuit connected to the plurality of optical I/O devices and a plurality of electronic devices; and
   a mediating device for transmitting a signal to the reconfigurable integrated circuit such that the reconfigurable integrated circuit changes a route of connection by selecting an optical path from a plurality of optical paths among the plurality of electronic devices and the plurality of optical I/O devices in accordance with the signal,
   wherein said optical I/O devices are photonic ball ICs.

2. A circuit board according to claim 1, wherein the number of said optical I/O devices is smaller than the number of said electronic devices.

3. A circuit board according to claim 1, wherein said reconfigurable integrated circuit is formed by using a field programmable gate array.

4. A circuit board according to claim 1, wherein said reconfigurable integrated circuit connects two or more electronic devices to a single optical I/O device.

* * * * *

UNITED STATES PATENT AND TRADEMARK OFFICE
CERTIFICATE OF CORRECTION

PATENT NO. : 7,386,200 B2 Page 1 of 1
APPLICATION NO. : 10/532720
DATED : June 10, 2008
INVENTOR(S) : Uchida It is certified that error appears in the above-identified patent and that said Letters Patent is hereby corrected as shown below:

ON PAGE 2, UNDER ITEM
    (56) "EP 1 219 994 A2   7/2002" should be deleted;
    (56) "JP 6 69490 11/1994" should be deleted;
    (56) "JP 7 183629 7/1995" should be deleted;
    (56) "JP 9 214073 8/1997" should be deleted;
    (56) "JP 10 341063 12/1998" should be deleted;
    (56) "10/341063" should read -- 10-341063 --; and
    (56) "WO 01/33895 A2 5/2001" should be deleted.

COLUMN 5:
    Line 38, "(PLDS)" should read -- (PLDs) --.

COLUMN 6:
    Line 46, "can" should read -- can be --.

COLUMN 7:
    Line 6, "delayor" should read -- delay or --.

COLUMN 11:
    Line 54, "PLDS)" should read -- PLDs) --.

Signed and Sealed this

Fourth Day of November, 2008

JON W. DUDAS
*Director of the United States Patent and Trademark Office*